(12) United States Patent
Taniguchi

(10) Patent No.: US 7,969,104 B2
(45) Date of Patent: Jun. 28, 2011

(54) ROTARY ELECTRIC SYSTEM DESIGNED TO UTILIZE ZERO-PHASE CIRCUIT

(75) Inventor: Makoto Taniguchi, Oobu (JP)

(73) Assignee: Denso Corporation, Kariya (JP)

( * ) Notice: Subject to any disclaimer, the term of this patent is extended or adjusted under 35 U.S.C. 154(b) by 523 days.

(21) Appl. No.: 12/117,837

(22) Filed: May 9, 2008

(65) Prior Publication Data

US 2008/0278102 A1  Nov. 13, 2008

(30) Foreign Application Priority Data

May 10, 2007 (JP) .................. 2007-125823
Nov. 15, 2007 (JP) .................. 2007-296653

(51) Int. Cl.
*H02P 6/00* (2006.01)
*H02K 3/00* (2006.01)
*H02K 3/28* (2006.01)

(52) U.S. Cl. ............... 318/139; 318/400.27; 310/198

(58) Field of Classification Search .............. 318/139, 318/400.21–400.28; 310/198, 208
See application file for complete search history.

(56) References Cited

U.S. PATENT DOCUMENTS

| | | | |
|---|---|---|---|
| 6,137,704 A | 10/2000 | Ito et al. | |
| 6,320,775 B1 | 11/2001 | Ito et al. | |
| 6,476,571 B1 | 11/2002 | Sasaki | |
| 2002/0000784 A1 | 1/2002 | Shamoto et al. | |
| 2003/0057908 A1 | 3/2003 | Kusaka et al. | |
| 2006/0214529 A1* | 9/2006 | Nishino et al. | 310/179 |
| 2007/0046130 A1 | 3/2007 | Enomoto et al. | |

FOREIGN PATENT DOCUMENTS

| | | |
|---|---|---|
| EP | 1 172 926 | 1/2002 |
| JP | 10-337047 | 12/1998 |
| JP | 2000-324857 | 11/2000 |
| JP | 2001-232241 | 8/2001 |
| JP | 2002-153090 | 5/2002 |
| JP | 2003-102181 | 4/2003 |
| JP | 2004-274807 | 9/2004 |
| JP | 2005-237068 | 9/2005 |
| JP | 2006-320074 | 11/2006 |
| JP | 2007-030643 | 2/2007 |
| JP | 2007-068330 | 3/2007 |
| JP | 2001-204196 | 7/2007 |

OTHER PUBLICATIONS

European Search Report dated Aug. 27, 2008 issued in counterpart European Application 08008774.5-2207.
Japanese Office Action dated Mar. 10, 2009, issued in corresponding Japanese Application No. 2007-296653, with English translation.

* cited by examiner

*Primary Examiner* — Bentsu Ro
(74) *Attorney, Agent, or Firm* — Nixon & Vanderhye P.C.

(57) ABSTRACT

In a rotary electric system, a rotary electric machine is provided with an armature core and star-connected multiphase windings with a neutral point wound in the armature core. Each of the star-connected multiphase windings has a predetermined winding configuration that prevents, when a zero-phase current is supplied from a direct current power source to the star-connected multiphase windings via the neutral point, a zero-phase magnetic flux created in the armature core based on the zero-phase current flowing in each phase winding of the star-connected multiphase windings from being cancelled out by a zero-phase magnetic flux created in the armature core based on the zero-phase current flowing in another one phase winding of the star-connected multiphase windings.

14 Claims, 14 Drawing Sheets

FIG.6

| | FIRST EMBODIMENT (FIG. 2) 7π/6 LONG PITCH WINDING | SECOND EMBODIMENT (FIG. 4) 5π/6 SHORT PITCH WINDING | COMPARATIVE EXAMPLE (FIG. 12) FULL PITCH WINDING | COMPARATIVE EXAMPLE (FIG. 13) 2π/3 SHORT PITCH WINDING |
|---|---|---|---|---|
| POLE-SLOT | 14P-12S | 10P-12S | 8P-24S | 8P-12S |
| SLOT PITCH (ELECTRIC ANGLE) | 210° | 150° | 60° | 120° |
| WINDING FACTOR | 0.966 | 0.966 | 1.0 | 0.866 |
| OUTPUT/SIZE | ○ | ○ | △ (LONG COIL END) | △ |
| ZERO-PHASE MAGNETIC FLUX AMOUNT (RELATIVE AMOUNT) | ≒1.0 | ≒1.0 | 0.33 | 0 |
| BOOST EFFECT | ○ | ○ | △ | × |

US 7,969,104 B2

ROTARY ELECTRIC SYSTEM DESIGNED TO UTILIZE ZERO-PHASE CIRCUIT

CROSS REFERENCE TO RELATED APPLICATIONS

This application is based on Japanese Patent Applications 2007-125823 and 2007-296653 filed on May 10, 2007 and Nov. 15, 2007, respectively. The descriptions of the patent applications are all incorporated herein by reference.

FIELD OF THE INVENTION

The present invention relates to a rotary electric system equipped with a rotary electric machine, and more particularly to such a rotary electric system designed to use a zero-phase circuit by connecting a direct voltage power source with a neutral point of star-connected multiphase windings thereof.

BACKGROUND OF THE INVENTION

An apparatus for controlling a brushless motor, as an example of rotary electric machines, is commonly designed to use a step-up converter for increasing a DC (Direct Current) voltage to be inputted to an inverter in order to increase a voltage to be applied to the brushless motor. This aims at reducing the effects of a back electromotive force generated by the rotation of the brushless motor at a high RPM.

The conventional structure of the control apparatus however may increase the cost of the control apparatus.

In order to increase a voltage to be applied to the brushless motor without increasing the cost, U.S. Pat. No. 6,320,775 corresponding to Japanese Patent Application Publication NO. H10-337047 discloses a technique that uses a zero-phase circuit of the brushless motor by connecting a battery with a neutral point of the star-connected multiphase windings of the brushless motor; this technique will be referred to as "zero-phase circuit utilization technique hereinafter.

SUMMARY OF THE INVENTION

Inventor of the present application has founded that some configurations of the star-connected multiphase windings of a rotary electric machine based on the zero-phase circuit utilization technique may reduce the effect of increasing the voltage to be applied to the rotary electric machine.

First, the principal of the zero-phase circuit utilization technique designed to increase the voltage to be applied to a brushless motor by connecting a battery with the neutral point of star-connected three-phase windings of a brushless motor will be described hereinafter.

FIG. 11 schematically illustrates a zero-phase equivalent circuit for one phase winding, such as a W-phase winding, of a brushless motor. The zero phase equivalent circuit consists of a DC voltage source 40 of the brushless motor, a W-phase winding 42 of the brushless motor, a bridge arm 44 constituted by a high-side and low-side switching elements corresponding to a three-phase inverter of the brushless motor, and a capacitor 46 corresponding to a smoothing capacitor of the brushless motor.

As viewed from the DC voltage source side, the zero-phase component equivalent circuit serves as a boost converter using electromagnetic energy charged in an armature core of the W-phase winding 42 working as a reactor (inductor).

Specifically, when the low-side switching element of the bridge arm 44 is in on state while the high-side switching element is in off state, an output DC voltage of the DC voltage source 40 causes a substantially direct current (a zero-phase current $I_0$) to flow through the W-phase winding 42. This charges electromagnetic energy in the armature core in which the W-phase winding 42 wound.

When the low-side switching element is turned off and the high-side switching element is turned on, the sum of a voltage generated by the electromagnetic energy charged in the armature core and the output DC voltage of the DC voltage source 40 is applied to the three-phase inverter. Specifically, the sum of the voltage generated by the electromagnetic energy charged in the armature core and the output DC voltage of the DC voltage source 40 is boosted as compared with the output DC voltage of the DC voltage source 40.

As well as the zero-phase component equivalent circuit for the W-phase winding, a zero-phase component equivalent circuit for each of the U-phase and V-phase windings is established.

Specifically, in a zero-phase mode in which all high-side switching elements or all low-side switching elements of the three-phase inverter are on state, a system integrated with the brushless motor serves as a boost converter equipped with parallely connected reactors corresponding to the three-phase windings.

As described above, the efficiency of the increase in the voltage to be applied to the inverter increases with increase in the electromagnetic energy to be charged in the armature core of each three-phase winding based on the zero-phase current flowing therethrough. In other words, in order to increase the voltage to be applied to the inverter, there should be an increase in a magnetic flux created in the armature core of each of the three-phase windings based on the zero-phase current flowing therethrough. The magnetic flux to be created in one-phase winding based on the zero-phase current flowing therethrough will be referred to as "zero-phase magnetic flux" hereinafter.

FIG. 12 schematically illustrates a winding structure of an armature and a pole structure of a rotor of a conventional four-pole, 12-slot rotary electric machine in full-pitch winding; this rotary electric machine is designed to utilize the zero-phase circuit utilization technique. In FIG. 12, reference numerals of 1 to 12 are assigned to 12 slots of an annular stator core of a stator serving as an armature. First to twelfth teeth of the stator core are formed on an inner periphery thereof and are equally spaced to define the first (1) to twelfth (12) slots therebetween.

A U-phase coil U (see solid lines in FIG. 12) is wound in the first slot (1), the fourth slot (4), the seventh slot (7), and the tenth slot (10). Similarly, a V-phase coil V (see dashed lines in FIG. 12) is wound in the third slot (3), the sixth slot (6), the ninth slot (9), and the twelfth slot (12). In addition, a W-phase coil W (see long dashed and short dashed lines in FIG. 12) is wound in the second slot (2), the fifth slot (5), the eighth slot (8), and the eleventh slot (11).

In FIG. 12, reference character N represent neutral points of the U- and V-phase coils U and V. In FIG. 12, reference character 100 represents the four poles (alternate north and south poles) of the rotor having a pole pitch of an electric angle of 180 degrees.

The zero-phase currents in the individual U-, V-, and W-phase coils U, V, and W in the direction of the arrows AR1 set up zero-phase magnetic fluxes in the teeth of the stator core.

In FIG. 12, the closed circle "●" in a portion of U-, V-, or W-phase winding in one of the slots represents the direction of a corresponding zero-phase current flowing from the back of the drawing page of FIG. 12 toward the front thereof. The cross mark "X" in a portion of U-, V-, or W-phase winding in one of the slots represents the direction of a corresponding zero-phase current flowing from the front of the drawing page of FIG. 12 toward the back thereof.

For example, in the teeth arranged between the first slot (1) and the twelfth slot (12), the zero-phase current in the U-phase coil U and that in the V-phase coil V induce respective zero-phase magnetic fluxes 51 and 52. Similarly, in the teeth arranged between the first slot (1) and the twelfth slot (12), the zero-phase current in the W-phase coil W induces a zero-phase magnetic flux 53. The direction of each of the generated zero-phase magnetic fluxes 51 to 53 are illustrated in FIG. 12 by their arrows.

FIG. 12 clearly demonstrates that, in each of the teeth of the armature core, two zero-phase magnetic fluxes in the zero-phase magnetic fluxes 51 to 53 are opposite in direction to each other so that they are canceled out each other. This results that the synthesis 55 of the zero-phase magnetic fluxes 51 to 53 in each of the teeth of the armature core becomes in magnitude nearly one third of the synthesis of the zero-phase magnetic fluxes 51 to 53 therein when the zero-phase magnetic fluxes 51 to 53 are generated in the same direction.

The reduction in the synthesis 55 of the zero-phase magnetic fluxes 51 to 53 in each of the teeth of the armature core may reduce the effect of boosting the voltage to be applied to the inverter based on the zero-phase utilization technique.

The problem arising in such a four-pole, 12-slot rotary electric machine in full-pitch winding arises as well in eight-pole, 24-slot rotary electric machines in o-pitch winding or 12-pole, 36-slot rotary electric machines in full-pitch winding.

Next, FIG. 13 schematically illustrates a winding structure of a conventional eight-pole, 12-slot rotary electric machine in a $2\pi/3$ fractional-pitch (short-pitch) winding; this rotary electric machine is designed to use the zero-phase circuit utilization technique. The $2\pi/3$ fractional-pitch winding represents that a coil span (coil pitch) of U-, V-, and W-phase coils is set to be an electric angle of $2\pi/3$ [rad] (120 degrees) smaller than a pole pitch of the eight poles of a rotor of the rotary electric machine; this pole pitch is set to be an electric angle of 180 degrees.

In FIG. 13, reference numerals of 1 to 12 are assigned to first to twelfth teeth of an annular stator core of a stator serving as an armature. The first (1) to twelfth (12) teeth of the stator core are formed on an inner periphery thereof and are equally spaced to define first to twelfth slots therebetween.

A U-phase coil U (see solid lines in FIG. 13) is repeatedly wound around each of the first tooth (1), the fourth tooth (4), the seventh tooth (7), and the tenth tooth (10), and the U-phase coils U are connected with each other in series. Similarly, a V-phase coil V (see dashed lines in FIG. 13) is repeatedly wound each of the second tooth (2), the fifth tooth (5), the eighth tooth (8), and the eleventh tooth (11), and the V-phase coils V are connected with each other in series. In addition, a W-phase coil W (see long dashed and short dashed lines in FIG. 13) is repeatedly wound around each of the third tooth (3), the sixth tooth (6), the ninth tooth (9), and the twelfth tooth (12), and the W-phase coils W are connected with each other in series.

Like FIG. 12, in FIG. 13, reference character N represent neutral points of the U-, V-, and W-phase coils U, V, and W.

The zero-phase currents in the individual U-, V-, and W-phase coils U; V, and W in the direction of the arrows AR2 set up zero-phase magnetic fluxes in the teeth of the stator core.

In FIG. 13, the closed circle "●" and the cross mark "X" have the same meaning as in FIG. 12.

FIG. 13 clearly demonstrates that, in each of the slots of the armature core, two zero-phase currents in the three zero-phase currents are opposite in direction to each other (see the adjacent marks ● and X in each of the slots). This results that zero-phase magnetic fluxes in each of the slots of the armature core created by the zero-phase currents are canceled out each other. For is reason, the synthesis of the zero-phase magnetic fluxes in each of the slots of the armature core becomes in magnitude nearly zero. Minimizing the synthesis of the zero-phase magnetic fluxes in each of the slots of the armature core may reduce the effect of boosting the voltage to be applied to the inverter based on the zero-phase circuit utilization technique.

As described above, in order to more effectively achieve the increase in the voltage to be applied to the inverter of a rotary electric machine designed to use the zero-phase circuit utilization technique, how to configure of the star-connected multiphase windings of a rotary electric machine has been founded to be important.

In view of the background, an object of at least one aspect of the present invention is to provide a rotary electric system having star-connected multiphase windings with a neutral point with which a direct voltage power source is connected; this rotary electric system is capable of enhancing the effect of increasing a voltage to be applied to an inverter of the rotary electric system as compared with conventional rotary electric systems.

According to one aspect of the present invention, there is provided a rotary electric system. The rotary electric system includes a rotary electric machine provided with an armature core and star-connected multiphase windings with a neutral point wound in the armature core. The rotary electric machine works to create torque when the star-connected multiphase windings are energized. The rotary electric system includes a direct current power source connected with the neutral point of the star-connected multiphase windings. The rotary electric system includes a multiphase inverter connected with the star-connected multiphase windings and configured to convert a direct current voltage of the direct current power source into multiphase alternating current voltages and to supply the multiphase alternating current voltages to the star-connected multiphase windings to thereby energize the star-connected multiphase windings. Each of the star-connected multiphase windings has a predetermined winding configuration that prevents, when a zero-phase current is supplied from the direct current power source to the star-connected multiphase windings via the neutral point, a zero-phase magnetic flux created in the armature core based on the zero-phase current flowing in each phase winding of the star-connected multiphase windings from being cancelled out by a zero-phase magnetic flux created in the armature core based on the zero-phase current flowing in another one phase winding of the star-connected multiphase windings.

BRIEF DESCRIPTION OF THE DRAWINGS

Other objects and aspects of the invention will become apparent from the following description of embodiments with reference to the accompanying drawings in which:

FIG. 6 is a table schematically illustrating the result of a comparison of winding factor, size, zero-phase magnetic flux amount (relative amount), and boost effect among the rotary electric systems according to the first and second embodiments and the rotary electric systems illustrated in FIGS. 12 and 13;

DETAILED DESCRIPTION OF EMBODIMENTS OF THE INVENTION

Embodiments of the present invention will be described hereinafter with reference to the accompanying drawings.

First Embodiment

Figure 1:
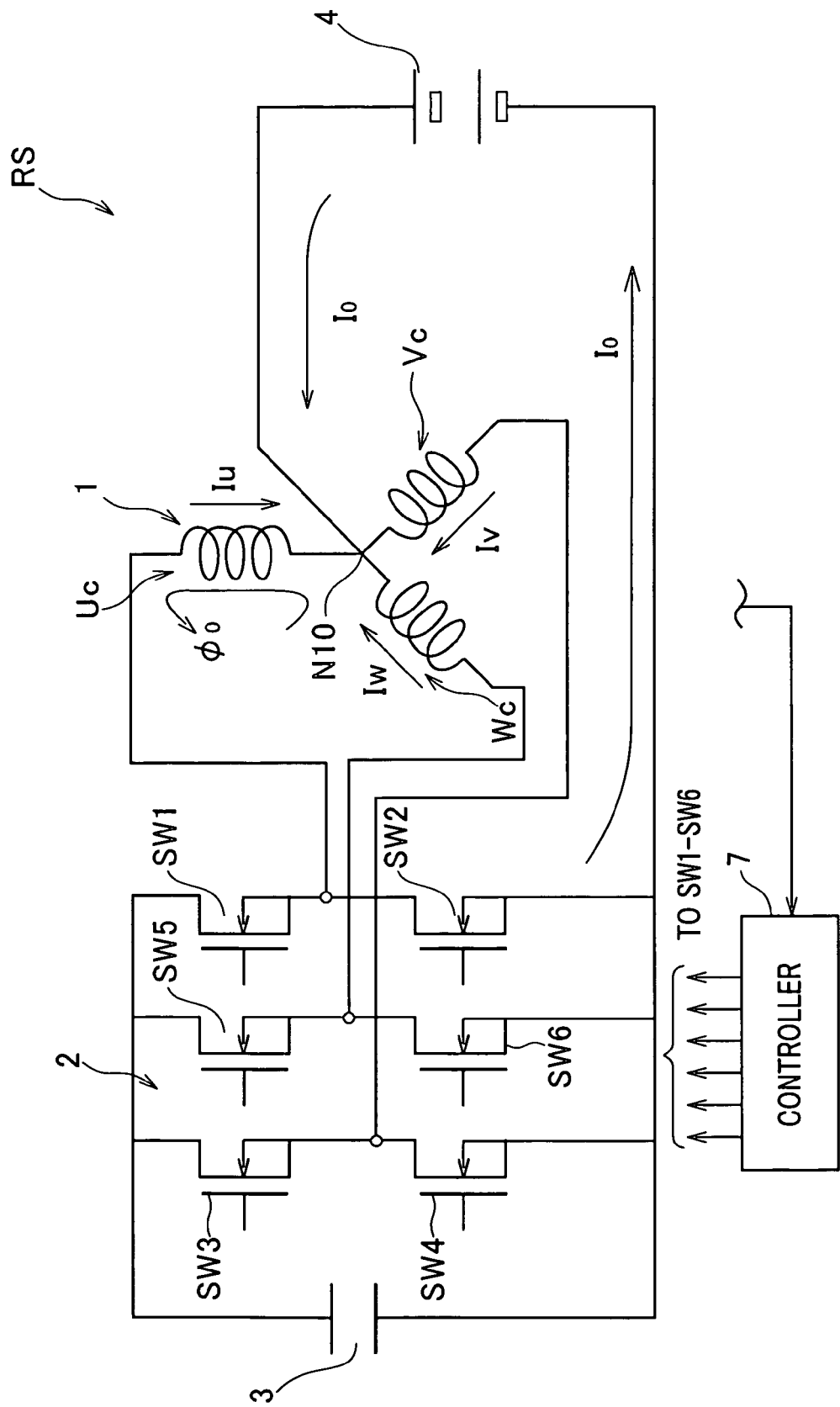
FIG. 1 is a circuit diagram schematically illustrating an example of the structure of a rotary electric system according to a first embodiment of the present invention.

Referring to FIG. 1, there is provided a rotary electric system RS according to a first embodiment of the present invention.

The rotary electric machine RS includes a fourteen-pole, 12-slot three-phase rotary electric machine 1, a three-phase inverter 2, a capacitor 3, a battery 4 as an example of DC power supplies, and a controller 7.

Figure 2A:
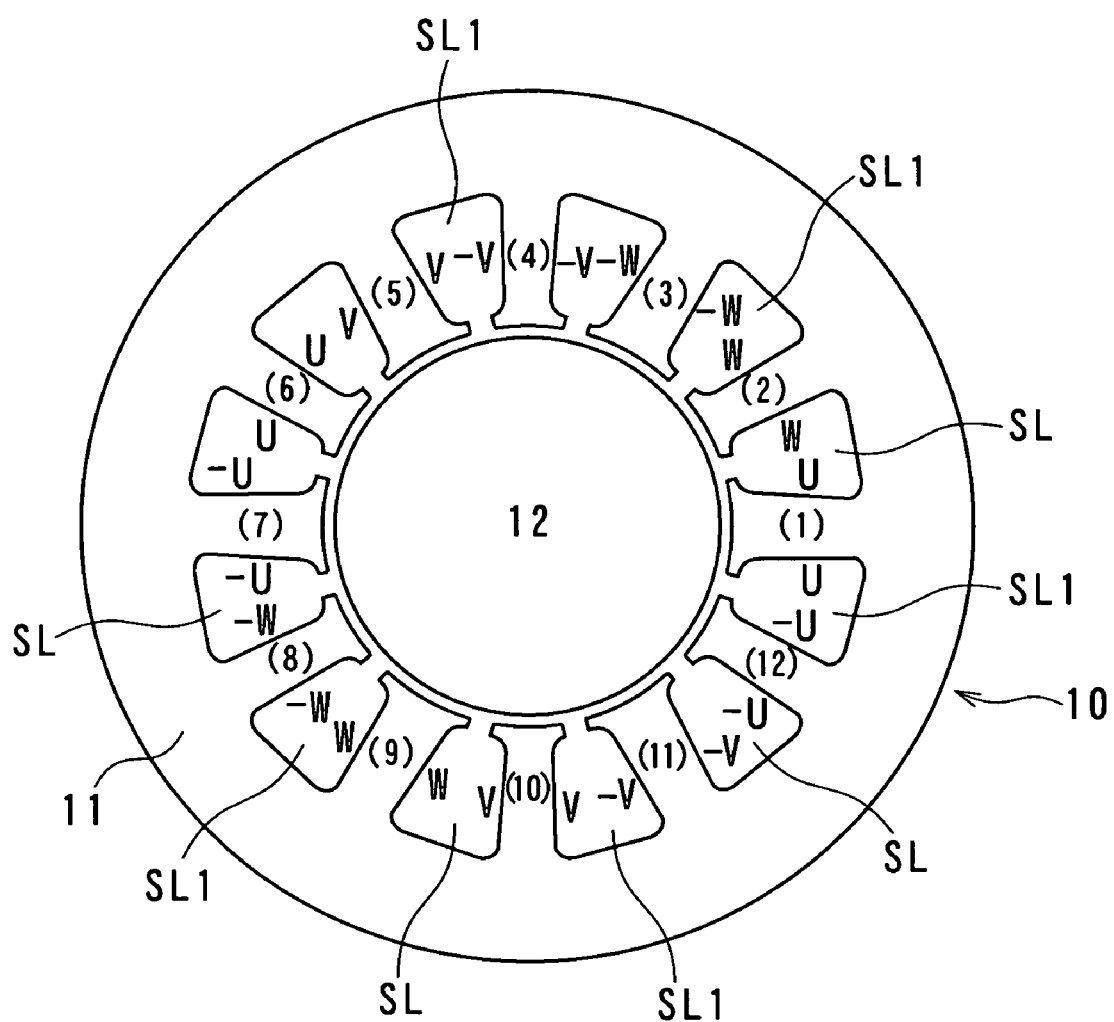
FIG. 2A is a lateral cross sectional view of an example of the structure of a rotary electric machine of the rotary electric system according to the first embodiment.
Figure 2B:
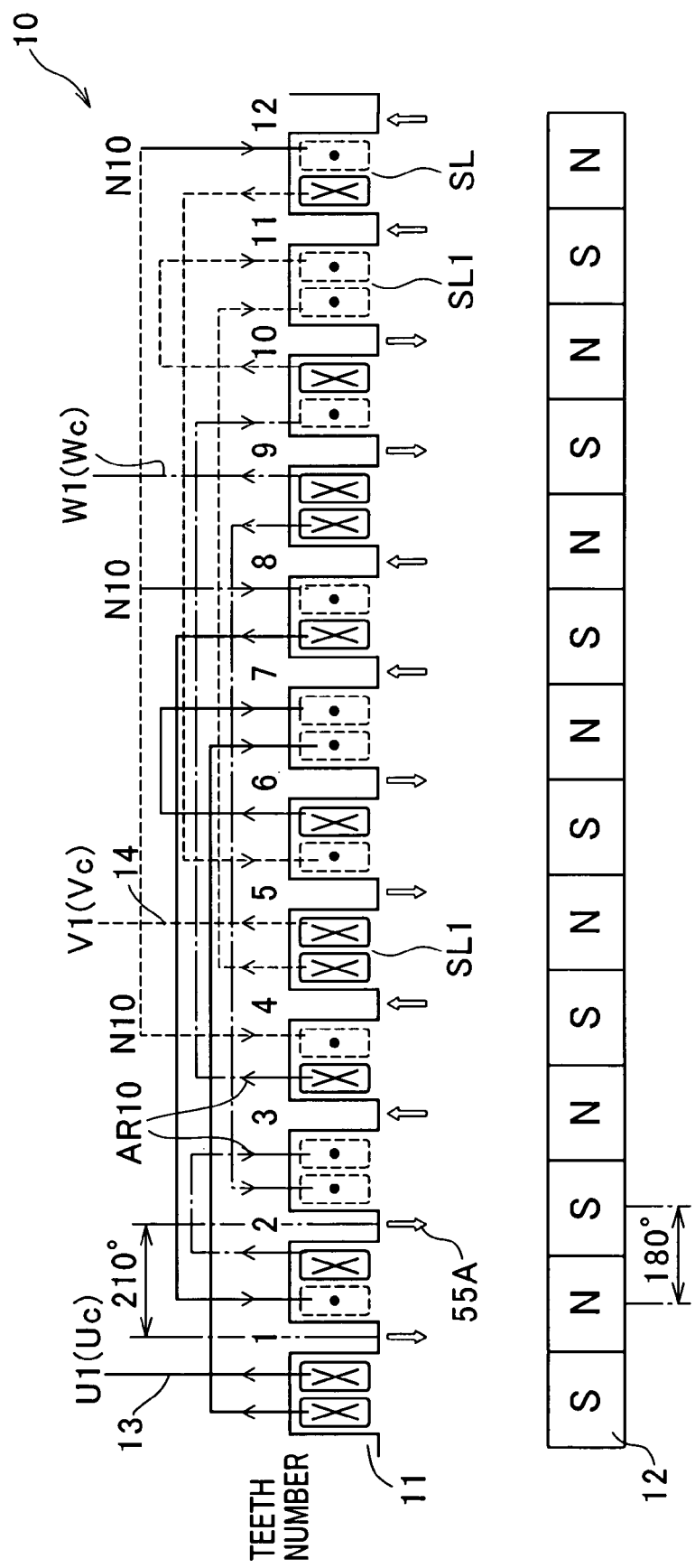
FIG. 2B is a circumferentially developed view schematically illustrating a winding structure of an armature and a pole structure of a rotor of the rotary electric machine illustrated in FIG. 2A according to the first embodiment.

Referring to FIGS. 2A and 2B, the rotary electric machine 1 is provided with an annular rotor 12. The rotor 12 is provided at its circumferential portion with the fourteen poles consisting of alternate north poles (N) and south poles (S). The fourteen poles has a pole pitch of an electric angle of 180 degrees.

The rotary electric machine 1 includes a stator 10 serving as an armature. The armature 10 has an annular armature core 11. The armature core 11 is disposed around the outer periphery of the outer periphery of the rotor 12 such that the inner periphery of the armature core 11 is opposite to the outer periphery of the rotor 12 with a predetermined air gap.

The armature core (stator core) 11 is formed at its inner periphery with first to twelfth teeth to which reference numerals (teeth numbers) of 1 to 12 are assigned. The first (1) to twelfth (12) teeth of the armature core 11 are equally spaced to define first to twelfth slots SL therebetween. A pitch between circumferentially adjacent slots SL is set to be an electric angle of 210 degrees ($7\pi/6$ [rad]).

The armature 10 also includes a set of three-phase windings U1, V1, W1 wound in the slots SL of the armature core 11 in a manner illustrated in FIG. 2B.

Specifically, a U-phase winding U1 (see solid lines in FIG. 2B) is repeatedly wound around each of the first tooth (1), the seventh tooth (7), the sixth tooth (6), and the twelfth tooth (12) such that:

the polarities (positive polarities) of the first tooth (1) and the sixth tooth (6) are the same as each other;

the polarities of the seventh tooth (7) and the twelfth tooth (12) are the same as each other and reversed from those of the first tooth (1) and the sixth tooth (6);

one end of the U-phase winding U1 wound around the first tooth (1) is connected in series with one end of the U-phase winding U1 wound around the seventh tooth (7);

the other end of the U-phase winding U1 wound around the seventh toot (7) is connected in series with one end of the U-phase winding U1 wound around the sixth tooth (6); and the other end of the U-phase winding U1 wound around the sixth tooth (6) is connected in series with one end of the U-phase winding U1 wound around the twelfth tooth (12).

The series-connected U-phase windings U1 wound in the armature core 11 set forth above form a U-phase coil Uc. The one end of the U-phase winding U1 wound around the first tooth (1) constitutes an output end of the U-phase coil Uc, and the other end of the U-phase winding U1 wound around the twelfth tooth (12) constitutes a neutral point N10 of the U-phase coil Uc.

Similarly, a V-phase winding V1 (see dashed lines in FIG. 2B) is repeatedly wound around each of the fifth tooth (5), the eleventh tooth (11), the tenth tooth (10), and the fourth tooth (4) such that:

the polarities (positive polarities) of the fifth tooth (5) and the tenth tooth (10) are the same as each other;

the polarities of the eleventh tooth (11) and the fourth tooth (4) are the same as each other and reversed from those of the fifth tooth (5) and the tenth tooth (10);

one end of the V-phase winding V1 wound around the fifth tooth (5) is connected in series with one end of the V-phase winding V1 wound around the eleventh tooth (1);

the other end of the V-phase winding V1 wound around the eleventh tooth (11) is connected in series with one end of the V-phase winding V1 wound around the tenth tooth (10); and the other end of the V-phase winding V1 wound around the tenth tooth (10) is connected in series with one end of the V-phase winding V1 wound around the fourth tooth (4).

The series-connected V-phase windings V1 wound in the armature core 11 set forth above form a V-phase coil Vc. The one end of the V-phase winding V1 wound around the fifth tooth (5) constitutes an output end of the V-phase coil Vc, and the other end of the V-phase winding V1 wound around the fourth tooth (4) constitutes a neutral point N10 of the V-phase coil Vc.

As well as the U- and V-phase windings, a W-phase winding W1 (see long dashed and short dashed lines in FIG. 2B) is repeatedly wound around each of the ninth tooth (9), the third tooth (3), the second tooth (2), and the eighth tooth (8) such that:

the polarities (positive polarities) of the ninth tooth (9) and the second tooth (2) are the same as each other;

the polarities of the third tooth (3) and the eighth tooth (8) are the same as each other and reversed from those of the ninth tooth (9) and the second tooth (2);

one end of the W-phase winding W1 wound around the ninth tooth (9) is connected in series with one end of the W-phase winding W1 wound around the third tooth (3);

the other end of the W-phase winding W1 wound around the third tooth (3) is connected in series with one end of the W-phase winding W1 wound around the second tooth (2); and the other end of the W-phase winding W1 wound around the second tooth (2) is connected in series with one end of the W-phase winding W1 wound around the eighth tooth (8).

The series-connected W-phase windings W1 wound in the armature core 11 set forth above form a W-phase coil Wc. The one end of the W-phase winding W1 wound around the ninth tooth (9) constitutes an output end of the W-phase coil Wc, and the other end of the W-phase winding W1 wound around the eighth tooth (8) constitutes a neutral point N10 of the W-phase coil Wc.

The neutral points N10 of the U-, V-, and W-phase coils Uc, Vc, and Wc are connected with each other to constitute star-connected U-, V-, and W-phase coils Uc, Vc, and Wc with the common neutral point N10.

Specifically, the configuration of the three-phase coils Uc, Vc, and Wc has a $7\pi/6$ long-pitch winding. The $7\pi/6$ long-pitch winding represents that a coil span (coil pitch) of U-, V-, and W-phase coils Uc, Vc, and Wc is set to be an electric angle of $7\pi/6$ [rad] (210 degrees) longer than a pole pitch of the fourteen poles of the rotor 12; this pole pitch is set to be an electric angle of 180 degrees.

The $7\pi/6$ long-pitch winding configuration of the U-, V-, and W-phase coils Uc, Vc, and Wc allows the U-, V-, and W-phase coils Uc, Vc, and Wc to be shifted by an electric angle of 120 degrees ($2\pi/3$ [rad]) in phase from each other.

Referring to FIG. 1, a positive electrode of the battery 4 is connected with the common neutral point N10 of the three-phase coils Uc, Vc, and Wc.

The three-phase inverter 2 is composed of a first pair (bridge arm) of series-connected switching elements SW1 and SW2, a second pair of series-connected switching elements SW3 and SW4, and a third pair of series-connected switching elements SW5 and SW6. The three-phase inverter 2 is also composed of flywheel diodes (not shown) connected in antiparallel with the switching elements SW1, SW2, SW3, SW4, SW5, and SW6, respectively.

As the switching elements SW1, SW2, SW3, SW4, SW5, and SW6, IGBTs (Insulated Gate Bipolar Transistors) or power MOSFETs can be used. When the power MOSFETs are used as the switching elements, the intrinsic diodes of the power MOSFETs can be used instead of the flywheel diodes.

The cathode of each of the flywheel diodes is connected with the drain of a corresponding one of the switching elements, and the anode thereof is connected with the source of a corresponding one of the switching elements.

The first to third bridge arms of switching elements SW1 to SW6 are parallely connected with each other in bridge configuration.

A connecting point through which the switching elements SW1 and SW2 of the first pair are connected with each other in series is connected with an output lead extending from the output end of the U-phase coil Uc. Similarly, a connecting point through which the switching elements SW3 and SW4 of the second pair are connected with each other in series is connected with an output lead extending from the output end of the V-phase coil Vc. Moreover, a connecting point through which the switching elements SW5 and SW6 of the third pair are connected with each other in series is connected with an output lead extending from the output end of the W-phase coil Wc.

One end of each of the first, second, and third bridge arms corresponding to a positive DC input terminal of the three-phase inverter 2 is connected with one electrode of the capacitor 3. The other end of each of the first, second, and third bridge arms corresponding to a negative DC input terminal of the three-phase inverter 2 is connected with a negative electrode of the battery 4 and with the other electrode of the capacitor 3.

The controller 7 is for instance connected with a control terminal of each of the switching elements SW1 to SW6 and with current sensors for measuring at least two phase currents in the three-phase currents flowing through the three-phase coils Uc, Vc, and Wc. The controller 7 is operative to individually drive on and off the switching elements SW1, SW2, SW3, SW4, SW5, and SW6 based on the measured current values sent from the current sensors.

Operations of the rotary electric machine RS will be described hereinafter.

In a normal mode, the controller 7 works to individually drive each of the switching elements SW1, SW2, SW3, SW4, SW5, and SW6 based on a corresponding one drive pulse with a predetermined duty cycle. This allows the three-phase inverter 2 to chop a voltage (DC voltage) of the battery 4 to thereby generate U-, V-, and W-phase command voltages. The U-, V-, and W-phase command voltages are supplied to the respective U-, V-, and W-phase coils Uc, Vc, and Wc of the rotary electric machine 1 to thereby rotate the rotor 12.

In a zero-phase mode, the controller 7 works to drive and maintain all of the high-side switching elements SW1, SW3, and SW5 on or all of the low-side switching elements SW2, SW4, and SW6 on. This allows a zero-phase current $I_0$ to flow from the battery 4 toward the U-, V-, and W-phase coils Uc, Vc, and Wc via the neutral point N10 thereof (see FIG. 1).

For example, in the zero-phase mode, in the U-phase coil Uc, when the low-side switching element SW2 of the first bridge arm is in on state while the high-side switching element SW1 is in off state, the voltage of the battery 4 causes the zero-phase current $I_0$ to flow through the U-phase coil Uc. This charges electromagnetic energy in the armature core 11.

When the low-side switching element SW2 is turned off and the high-side switching element SW1 is turned on, the sum of a voltage generated by the electromagnetic energy charged in the armature core 11 of the U-phase coil Uc and the voltage of the battery 4 is applied to the DC input terminal of the three-phase inverter 2. Specifically, the potential of the positive DC input terminal of the three-phase inverter 2 is boosted by the sum of the voltage generated by the electromagnetic energy charged in the armature core 11 and the voltage of the battery 4.

In the zero-phase mode, assuming that U-, V-, W-phase currents (three-phase alternating currents) are expressed by respective Iu, Iv, and Iw, the following equation is established:

$$Iu+Iv+Iw+I_0=0$$

This equation provides the relationship between the zero-phase current $I_0$ and the U-, V-, W-phase currents Iu, Iv, and Iw; this relationship is represented by the following equation:

$$I_0=-(Iu+Iv+Iw)$$

Figure 3:
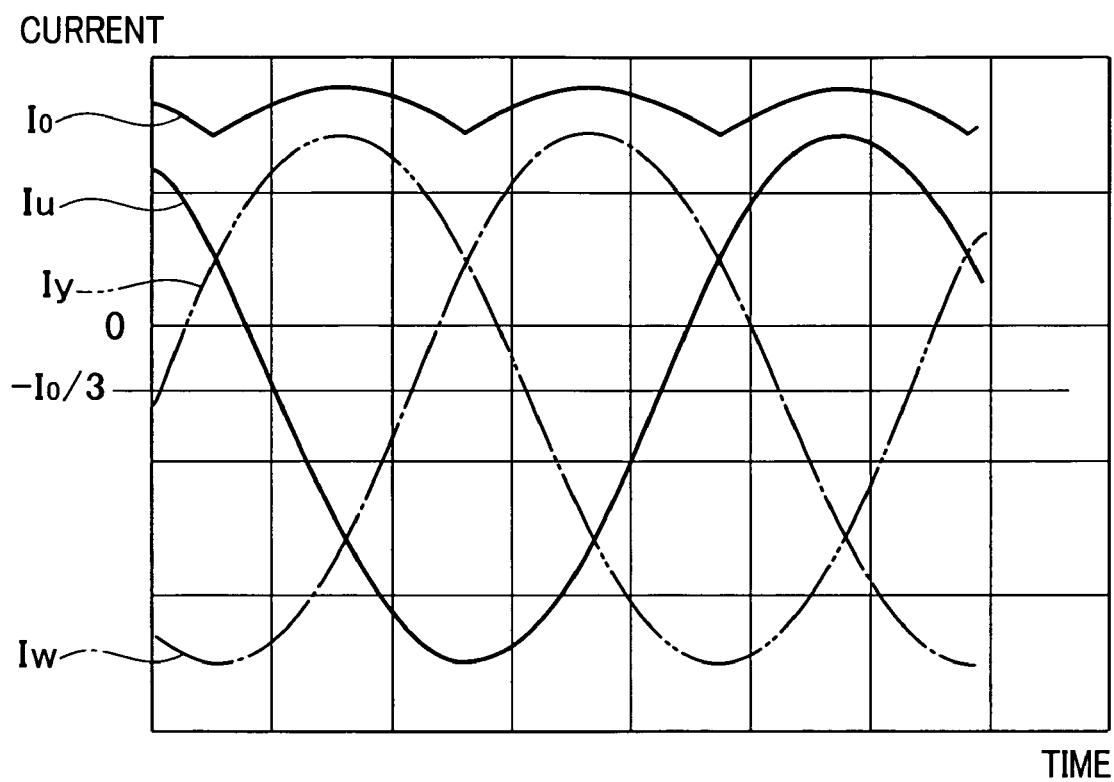
FIG. 3 is a graph schematically illustrating the oscillation of each of U-phase, V-phase, and W-phase currents in time and that of a zero-phase current in time according to the first embodiment.

When the zero-phase current $I_0$ is uniformly distributed into the U-, V-, W-phase currents Iu, Iv, and Iw, an average value of an amplitude of an output current of the three-phase inverter 2 for each phase of the U-, V-, W-phase currents Iu, Iv, and Iw is offset by $-I_0/3$ (see FIG. 3).

Electromagnetic energy to be created by the offset current $-I_0/3$ achieves the effect of boosting the voltage of the battery 4 to be applied to the three-phase inverters 2. For this reason, in order to effectively increase the voltage of the battery 4 to be applied to the three-phase inverter 2, how to increase the electromagnetic energy to be created by the offset current $-I_0/3$ is an important point.

Note that each of the U-, V-, W-phase currents Iu, Iv, and Iw sinusoidally oscillates while maintaining the phase difference of an electric angle of 120 degrees therebetween. Adjustment of an amplitude of each of the U-, V-, W-phase currents Iu, Iv, and Iw can smoothly control torque to be applied to the rotor 12 of the rotary electric machine 1.

Next, zero-phase magnetic fluxes $\phi_0$ to be created in the armature core 11 of the armature 10 when the zero-phase current $I_0$ is supplied to each of the U-, V-, and W-phase coils Uc, Vc, and Wc via the neutral point N10 thereof will be described hereinafter with reference to FIG. 2B.

As illustrated in FIG. 2B, because the zero-phase currents are a direct current, it is unnecessary to consider their phases, the zero-phase currents simultaneously flow in the individual U-, V-, and W-phase coils Uc, Vc, and Wc in the direction of the arrows AR10. This results that zero-phase magnetic fluxes are set up in the teeth of the armature core 11.

In FIG. 2B, the closed circle "●" in a portion of the U-, V-, or W-phase coils Uc, Vc, and Wc in one of the slots SL represents the direction of a corresponding zero-phase current flowing from the back of the drawing page of FIG. 2B toward the front thereof. The cross mark "X" in a portion of the U-, V-, or W-phase coils Uc, Vc, and Wc in one of the slots SL represents the direction of a corresponding zero-phase current flowing from the front of the drawing page of FIG. 2 toward the back thereof.

FIG. 2B clearly demonstrates that, in alternate slots SL1 of the armature core 11, two zero-phase currents in the three zero-phase currents flow in the same direction (see the adjacent marks "● ●" or "X X" in the alternate slots SL1).

This results that, in the respective teeth of the armature core 11, zero-phase magnetic fluxes 55A are created. The zero-phase magnetic fluxes 55A are inverted in polarity every two teeth.

For example, in each of the first tooth (1), sixth tooth (6), seventh tooth (7), and twelfth tooth (12), the zero-phase magnetic flux 55A is created by the zero-phase current flowing in the U-phase coil Uc. In each of the fourth tooth (4), fifth tooth (5), tenth tooth (10), and eleventh tooth (11), the zero-phase magnetic flux 55A is created by the zero-phase current flowing in the V-phase coil Vc. Similarly, in each of the second tooth (2), third tooth (3), eighth tooth (8), and ninth tooth (9), the zero-phase magnetic flux 55A is created by the zero-phase current flowing in the W-phase coil Vc.

Specifically, the configuration of the U-, V-, or W-phase coils Uc, Vc, and Wc of the rotary electric machine 1 according to the first embodiment prevent the zero-phase magnetic fluxes created by the zero-phase currents flowing in the U-, V-, or W-phase coils Uc, Vc, and Wc from being canceled out each other. This increases the zero-phase magnetic flux created in each of the teeth of the armature core 11, making it possible to enhance the effect of boosting the voltage of the battery 4 to be applied to the tree-phase inverter 2.

The effect obtained by the fourteen-pole, 12-slot rotary electric system RS is obtained as well by eight-pole, ten-slot rotary electric machines described for example hereinafter.

Second Embodiment

Figure 4:
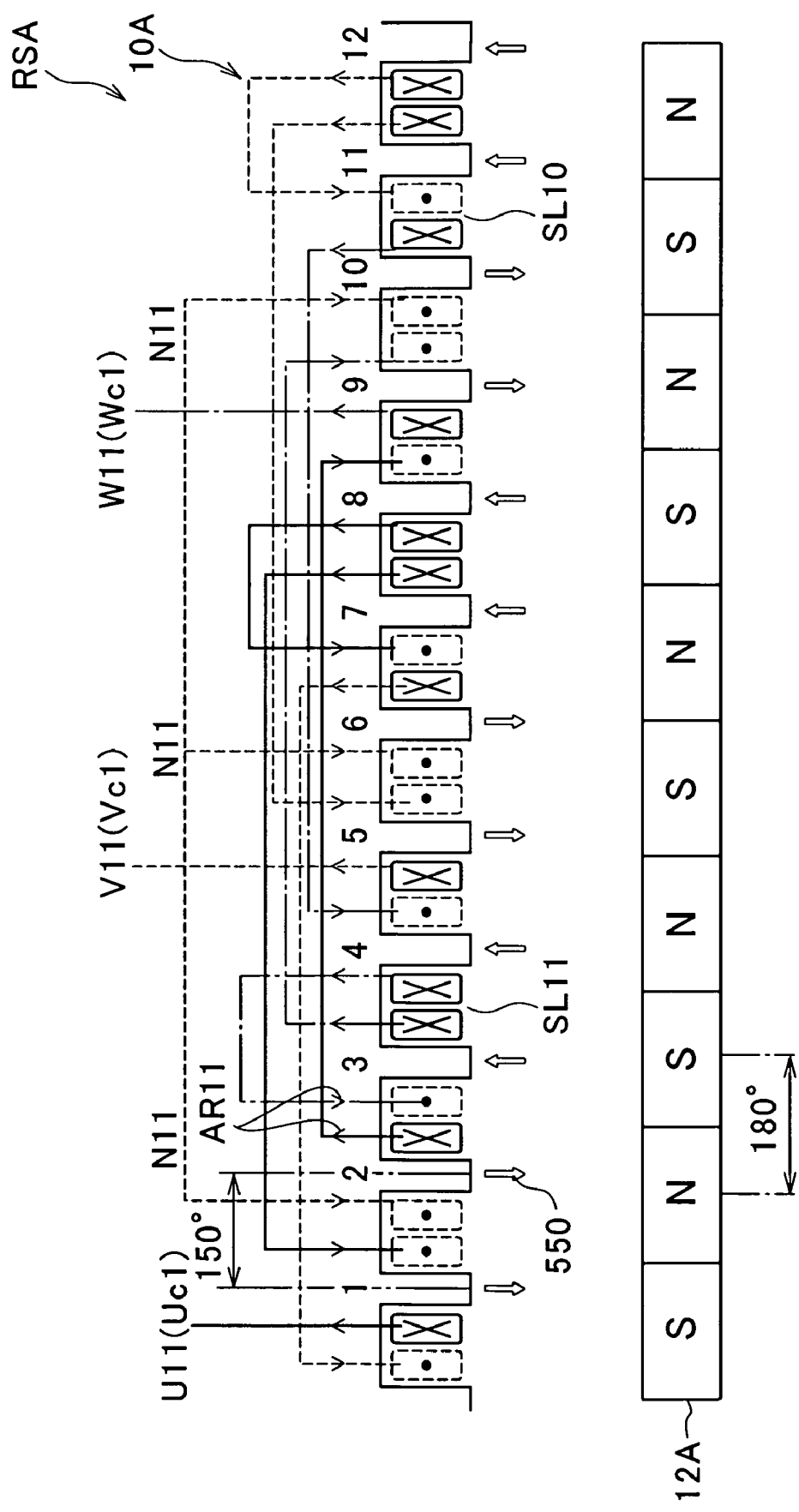
FIG. 4 is a circumferentially developed view schematically illustrating a winding structure of an armature and a pole structure of a rotor of a ten-pole, 12-slot rotary electric system according to a second embodiment of the present invention.

FIG. 4 schematically illustrates a winding structure of an armature 11A and a pole structure of a rotor 12A of a ten-pole, 12-slot rotary electric system RSA according to a second embodiment of the present invention.

The structure of the rotary electric system RSA according to the second embodiment is substantially identical to that of the rotary electric system RS according to the first embodiment except for the winding structure of the rotary electric system RSA and the number of poles of a rotor 12A thereof. So, like parts between the rotary electric systems RS and RSA according to the first and second embodiments, to which like reference characters are assigned, are omitted or simplified in description.

Like the first embodiment, when reference numerals (teeth numbers) of 1 to 12 are assigned to first to twelfth teeth of an armature core 11A formed on the inner periphery thereof, the first (1) to twelfth (12) teeth are equally spaced to define first to twelfth slots SL10 therebetween. A pitch between circumferentially adjacent slots SL10 is set to be an electric angle of 150 degrees ($5\pi/6$ [rad]).

The armature 10A also includes a set of three-phase windings U11, V11, W11 wound in the slots SL10 of the armature core 11A in a manner illustrated in FIG. 4.

Specifically, a U-phase winding U11 (see solid lines in FIG. 4) is repeatedly wound around each of the first tooth (1), the seventh tooth (7), the eighth tooth (8), and the second tooth (2) such that:

the polarities (positive polarities) of the first tooth (1) and the eighth tooth (8) are the same as each other;

the polarities of the seventh tooth (7) and the second tooth (2) are the same as each other and reversed from those of the first tooth (1) and the eighth tooth (8);

one end of the U-phase winding U11 wound around the first tooth (1) is connected in series with one end of the U-phase winding U11 wound around the seventh tooth (7);

the other end of the U-phase winding U1 wound around the seventh tooth (7) is connected in series with one end of the U-phase winding U1 wound around the eighth tooth (8); and the other end of the U-phase winding U1 wound around the eighth tooth (8) is connected in series with one end of the U-phase winding U11 wound around the second tooth (2).

The series-connected U-phase windings U11 wound in the armature core 11A set forth above form a U-phase coil Uc1. The one end of the U-phase winding U11 wound around the first tooth (1) constitutes an output end of the U-phase coil Uc1, and the other end of the U-phase winding U11 wound around the second tooth (2) constitutes a neutral point N11 of the U-phase coil Uc1.

Similarly, a V-phase winding V11 (see dashed lines in FIG. 4) is repeatedly wound around each of the fifth tooth (5), the eleventh tooth (11), the twelfth tooth (12), and the sixth tooth (6) such that:

the polarities (positive polarities) of the fifth tooth (5) and the twelfth tooth (12) are the same as each other;

the polarities of the eleventh tooth (11) and the sixth tooth (6) are the same as each other and reversed from those of the fifth tooth (5) and the twelfth tooth (12);

one end of the V-phase winding V11 wound around the fifth tooth (5) is connected in series with one end of the V-phase winding V11 wound around the eleventh tooth (11);

the other end of the V-phase winding V11 wound around the eleventh tooth (11) is connected in series with one end of the V-phase winding V11 wound around the twelfth tooth (12); and the other end of the V-phase winding V11 wound around the twelfth tooth (12) is connected in series with one end of the V-phase winding V11 wound around the sixth tooth (6).

The series-connected V-phase windings V11 wound in the armature core 11A set forth above form a V-phase coil Vc. The one end of the V-phase winding V11 wound around the fifth tooth (5) constitutes an output end of the V-phase coil Vc1, and the other end of the V-phase winding V11 wound around the sixth tooth (6) constitutes a neutral point N11 of the V-phase coil Vc1.

As well as the U- and V-phase windings, a W-phase winding W11 (see long dashed and short dashed lines in FIG. 4) is repeatedly wound around each of the ninth tooth (9), the third tooth (3), the fourth tooth (4), and the tenth tooth (10) such that:

the polarities (positive polarities) of the ninth tooth (9) and the fourth tooth (4) are the same as each other;

the polarities of the third tooth (3) and the tenth tooth (10) are the same as each other and reversed from those of the ninth tooth (9) and the fourth tooth (4);

one end of the W-phase winding W11 wound around the ninth tooth (9) is connected in series with one end of the W-phase winding W11 wound around the third tooth (3);

the other end of the W-phase winding W11 wound around the third tooth (3) is connected in series with one end of the W-phase winding W11 wound around the fourth tooth (4); and the other end of the W-phase winding W11 wound around the fourth tooth (4) is connected in series with one end of the W-phase winding W11 wound around the tenth tooth (10).

The series-connected W-phase windings W11 wound in the armature core 11A set forth above form a W-phase coil Wc1. The one end of the W-phase winding W11 wound around the ninth tooth (9) constitutes an output end of the W-phase coil Wc1, and the other end of the W-phase winding W11 wound around the tenth tooth (10) constitutes a neutral point N11 of the W-phase coil Wc1.

The neutral points N11 of the U-, V-, and W-phase coils Uc1, Vc1, and Wc1 are connected with each other to constitute star-connected U-, V-, and W-phase coils Uc1, Vc1, and Wc1 with the common neutral point N11.

Specifically, the configuration of the three-phase coils Uc1, Vc1, and Wc1 has a $5\pi/6$ fractional-pitch winding. The $5\pi/6$ fractional-pitch winding represents that a coil span of U-, V-, and W-phase coils Uc1, Vc1, and Wc1 is set to be an electric angle of $5\pi/6$ [rad] (150 degrees) shorter than a pole pitch of the ten poles of the rotor 12A; this pole pitch is set to be an electric angle of 180 degrees.

In FIG. 4, the closed circle "●" and the cross mark "X" have the same meaning as in FIG. 2b.

In the second embodiment, in FIG. 4, zero-phase currents simultaneously flow in the individual U-, V-, and W-phase coils Uc1, Vc1, and Wc1 in the direction of the arrows AR11. This results that zero-phase magnetic fluxes are set up in the teeth of the armature core 11A.

FIG. 4 clearly demonstrates that, in alternate slots SL11 of the armature core 11A, two zero-phase currents in the three zero-phase currents flow in the same direction (see the adjacent marks "● ●" or "X X" in the alternate slots SL11).

This results that, in the respective teeth of the armature core 11A, zero-phase magnetic fluxes 550 are created. The zero-phase magnetic fluxes 550 are inverted in polarity every two teeth.

Specifically, as well as the first embodiment, the configuration of the U-, V-, or W-phase coils Uc11, Vc11, and Wc11 of the rotary electric machine 1A according to the second embodiment prevent the zero-phase magnetic fluxes created by the zero-phase currents flowing in the U-, V-, or W-phase coils Uc11, Vc11, and Wc1 from being canceled out each other. This increases the zero-phase magnetic flux created in each of the teeth of the armature core 11A, making it possible to enhance the effect of boosting the voltage of the battery 4 to be applied to the three-phase inverter 2.

Third Embodiment

Figure 5:
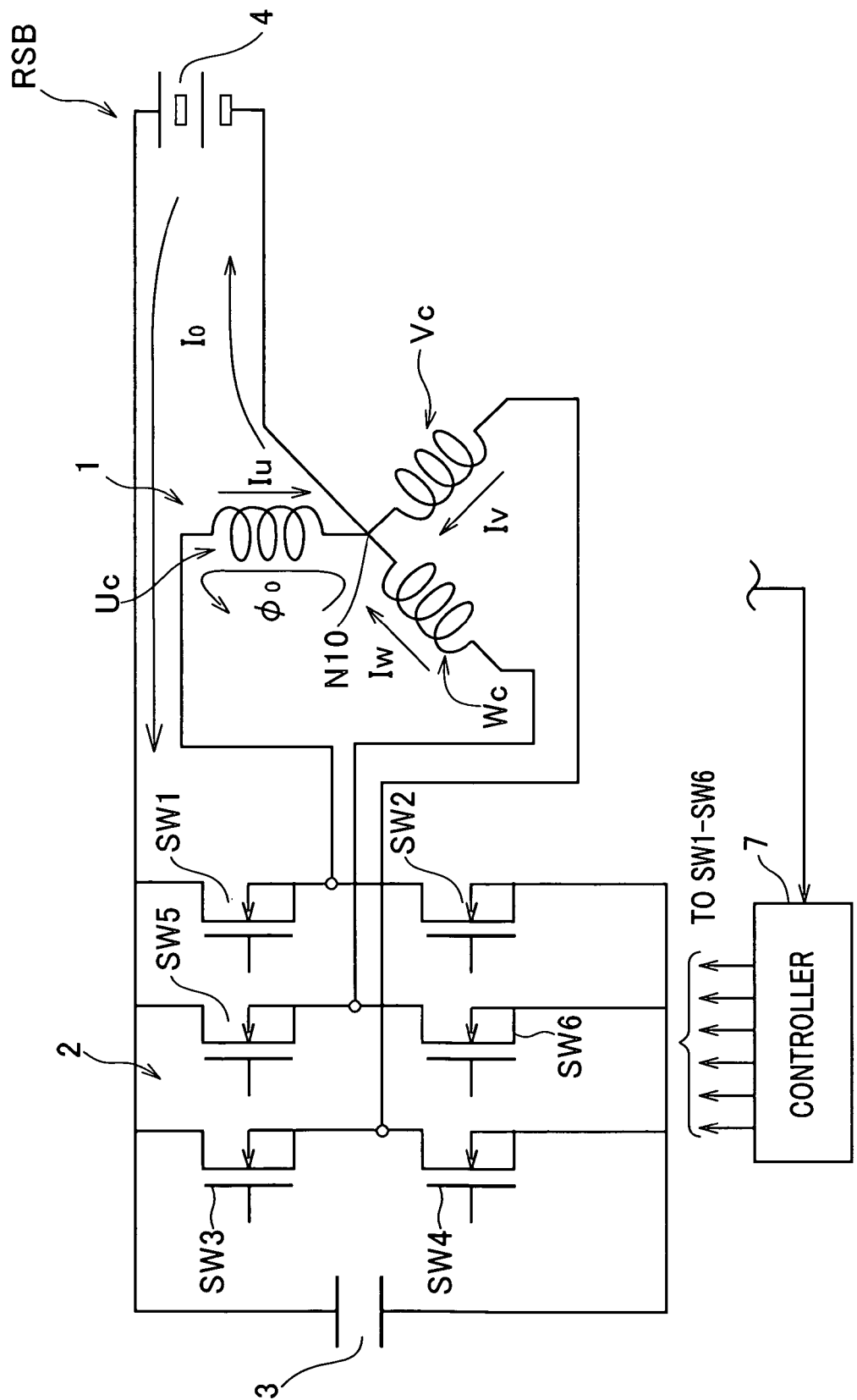
FIG. 5 is a circuit diagram schematically illustrating an example of the structure of a rotary electric system according to a third embodiment of the present invention.

FIG. 5 schematically illustrates a rotary electric system RSB according to a third embodiment of the present invention.

The structure of the rotary electric system RSB according to the third embodiment is substantially identical to that of the rotary electric system RS according to the first embodiment except for the connection between the battery 4 and each of the rotary electric machine 1 and the three-phase inverter 2. So, like parts between the rotary electric systems RS and RSB according to the first and third embodiments, to which like reference characters are assigned, are omitted or simplified in description.

In the rotary electric machine RSB, the negative electrode of the battery 4 is connected with the common neutral point N10 of the three-phase coils Uc, Vc, and Wc.

The positive electrode of the battery 4 is connected with the one end of each of the series-connected switching elements SW1 and SW2, the series-connected switching elements SW3 and SW4, and the series-connected switching elements SW5 and SW6.

In the confirmation of the rotary electric machine RSB, in the zero-phase mode, in the U-phase coil Uc, when the high-side switching element SW1 of the first bridge arm is in on state while the low-side switching element SW2 is in off state, the voltage of the battery 4 causes the zero-phase current $I_0$ to flow through the U-phase coil Uc in a direction indicated by the arrow in FIG. 5. This charges electromagnetic energy in the armature core 11.

When the high-side switching element SW1 is turned off and the low-side switching element SW2 is turned on, the sum of a voltage generated by the electromagnetic energy charged in the armature core 11 and the voltage of the battery 4 is applied to the three-phase inverter 2. Specifically, the potential of the negative DC input terminal of the three-phase inverter 2 becomes zero or less so that the potential of the positive DC input terminal of the three-phase inverter 2 is boosted by the sum of the voltage generated by the electromagnetic energy charged in the armature core 11 and the voltage of the battery 4.

In the zero-phase mode, because the zero-phase current $I_0$ flows in a direction returning to the battery 4; the following equation is established:

$$Iu+Iv+Iw-I_0=0$$

This equation provides the relationship between the zero-phase current $I_0$ and the U-, V-, W-phase currents Iu, Iv, and Iw; this relationship is represented by the following equation:

$$I_0=(Iu+Iv+Iw)$$

When the zero-phase current $I_0$ is uniformly distributed into the U-, V-, W-phase currents Iu, Iv, and Iw, an average value of an amplitude of an output current of the three-phase inverter 2 for each of the U-, V-, W-phase currents Iu, Iv, and Iw is offset by $I_0/3$.

As described above, the configuration of the rotary electric machine RSB boosts the potential of the positive DC input terminal of the three-phase inverter 2 by the sum of the voltage generated by the electromagnetic energy charged in the armature core 11 and the voltage of the battery 4. This makes it possible to enhance the effect of increasing the voltage of the battery 4 to be applied to the three-phase inverter 2 as with the first and second embodiments.

Figure 12:
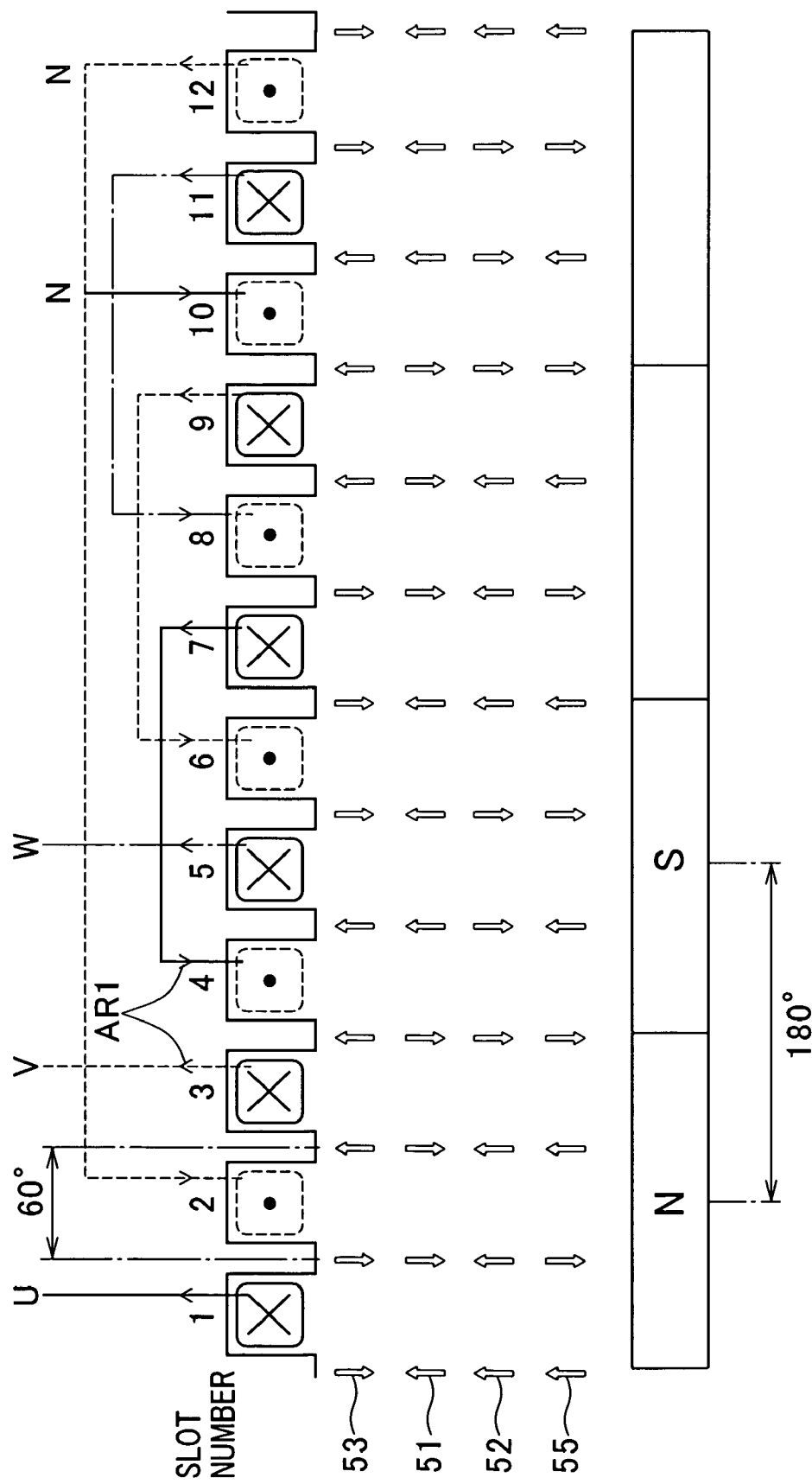
FIG. 12 is a circumferentially developed view schematically illustrating a winding structure of an armature and a pole structure of a rotor of a conventional four-pole, 12-slot rotary electric machine in full-pitch winding.
Figure 13:
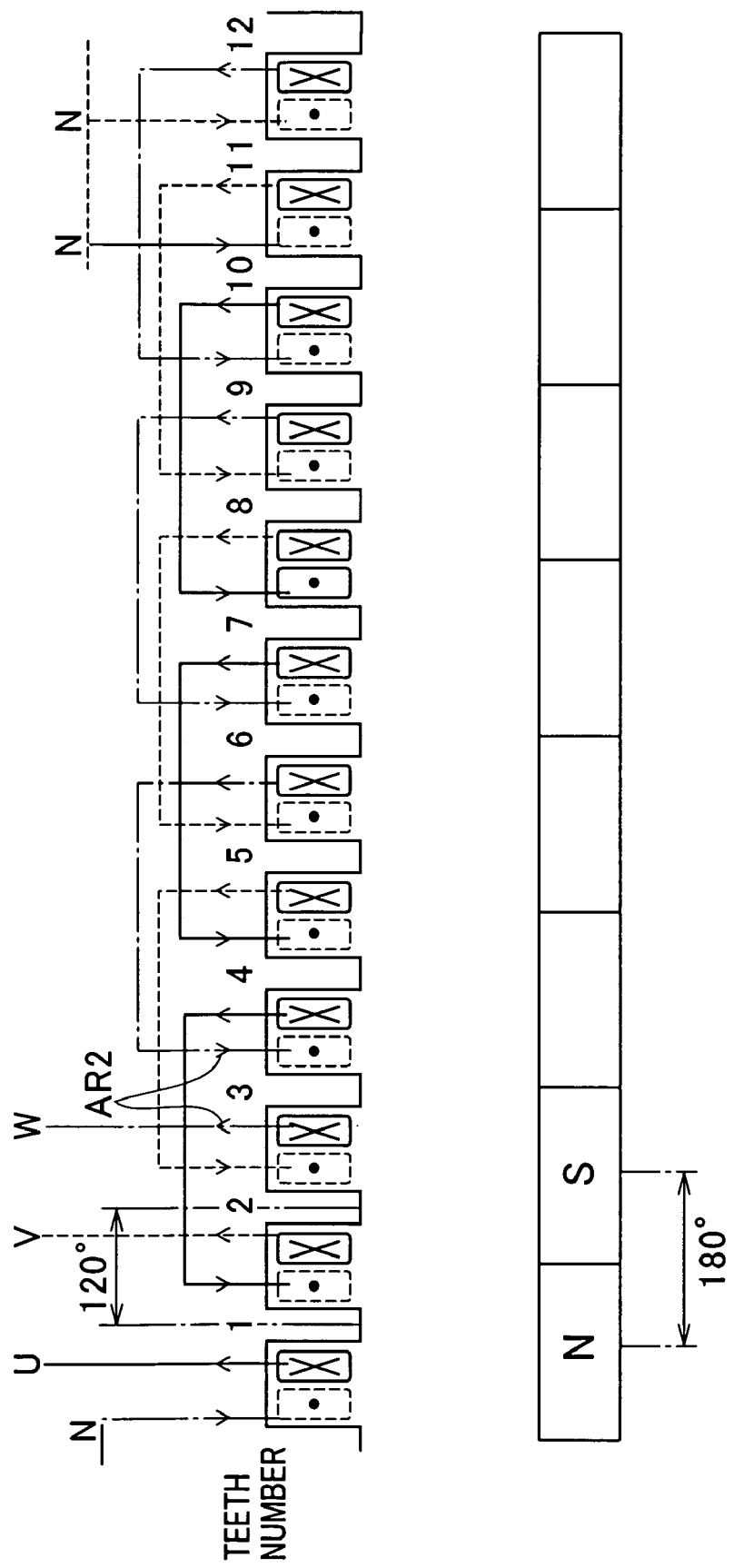
FIG. 13 is a circumferentially developed view schematically illustrating a winding structure of an armature and a pole structure of a rotor of a conventional eight-pole, 12-slot rotary electric machine in a $2\pi/3$ fractional-pitch winding.

FIG. 6 illustrates the result of a comparison of winding factor, size, zero-phase magnetic flux amount (relative amount), and boost effect among the rotary electric systems RS, the rotary electric system RSA, the rotary electric system illustrated in FIG. 12, and the rotary electric system illustrated in FIG. 13. In FIG. 6, the circle mark "○" represents a high effect, the triangle mark "Δ" represents an intermediate effect, and the cross mark "X" represents a low effect.

FIG. 6 clearly shows that the zero-phase magnetic flux amount of each of the rotary electric systems RS and RSA is greater than that of each of the comparative examples of the rotary electric systems illustrated in FIGS. 12 and 13. Thus, it is possible to demonstrate an excellent effect of boosting the voltage of the battery 4 to be applied to the three-phase inverter 2.

Fourth Embodiment

Figure 7:
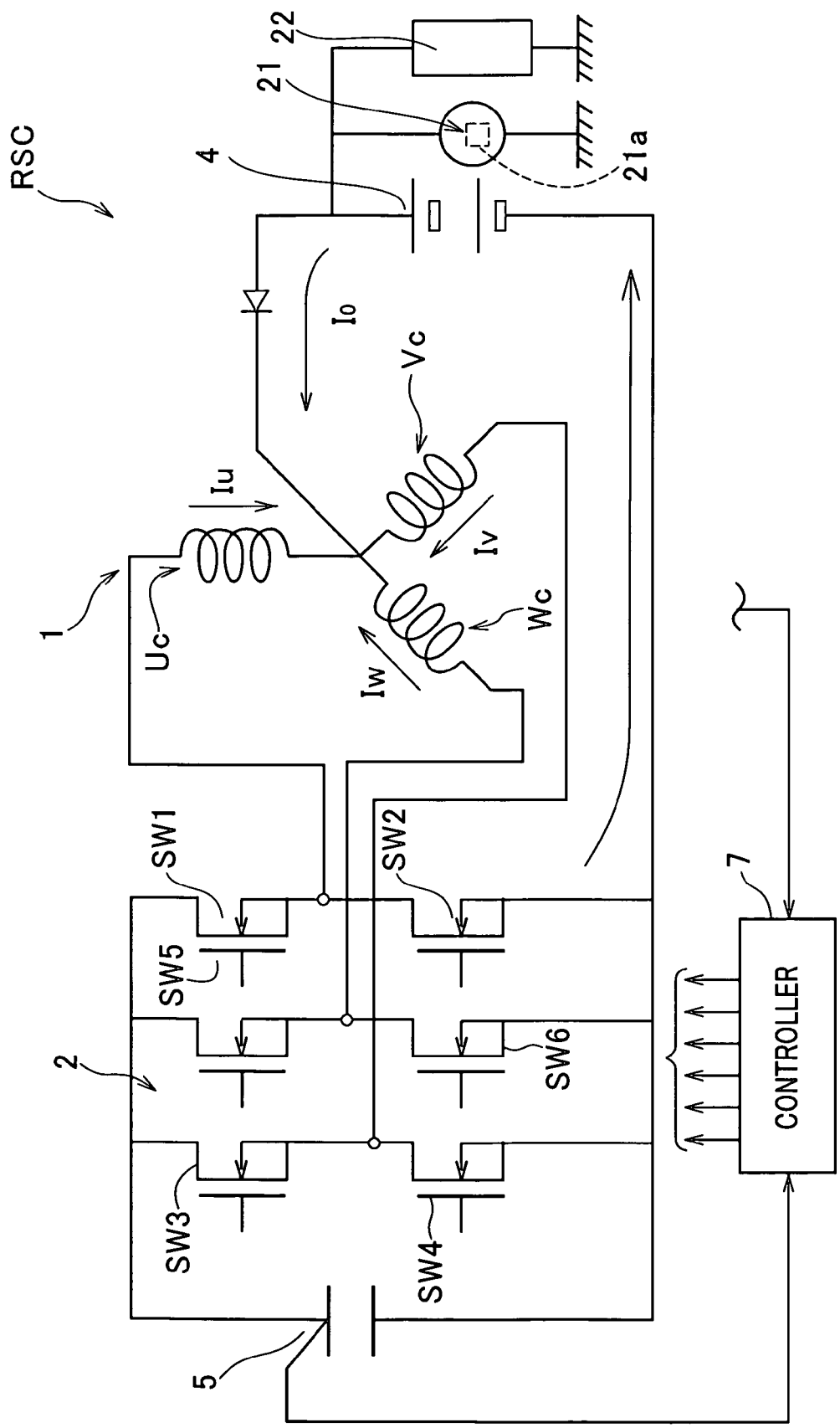
FIG. 7 is a circuit diagram schematically illustrating an example of the structure of a rotary electric system according to a fourth embodiment of the present invention.

FIG. 7 schematically illustrates a rotary electric system RSC according to a fourth embodiment of the present invention.

The structure of the rotary electric system RSC according to the fourth embodiment is substantially identical to that of the rotary electric system RS according to the first embodiment except for some points described hereinafter. So, like parts between the rotary electric systems RS and RSC according to the first and fourth embodiments, to which like reference characters are assigned, are omitted or simplified in description.

In the fourth embodiment, the rotary electric system RSC is installed in advance in a motor vehicle. The three-phase rotary electric machine 1 serves as a power steering motor for assisting the driver's operation of a steering wheel of the motor vehicle.

In the rotary electric system RSC, in place of the capacitor 3, an electrical double layer capacitor 5 is provided to be connected between the positive and negative DC input terminals of the three-phase inverter 2.

The rotary electric machine RSC is also equipped with a diode 6. The anode of the diode 6 is connected with the positive electrode of the battery 4, and the cathode thereof is connected with the neutral point N10 of the three-phase coils Uc, Vc, and Wc. The diode 6 works to prevent currents from flowing from the neutral point N10 toward the battery 4.

The controller 7 according to the fourth embodiment is connected with the capacitor 5 and operative to control the charge state of the capacitor 5 in addition to drive the switching elements SW1 to SW6 of the three-phase inverter 2.

In addition, the rotary electric system RSC is equipped with an alternator 21 and auxiliaries 22. The alternator 21 is integrated with an voltage regulator 21a and works to output a DC voltage while regulating it and to charge the battery 4 based on the output DC voltage. The auxiliaries 22 is configured to be driven based on electric power supplied from the battery 4.

Figure 8:
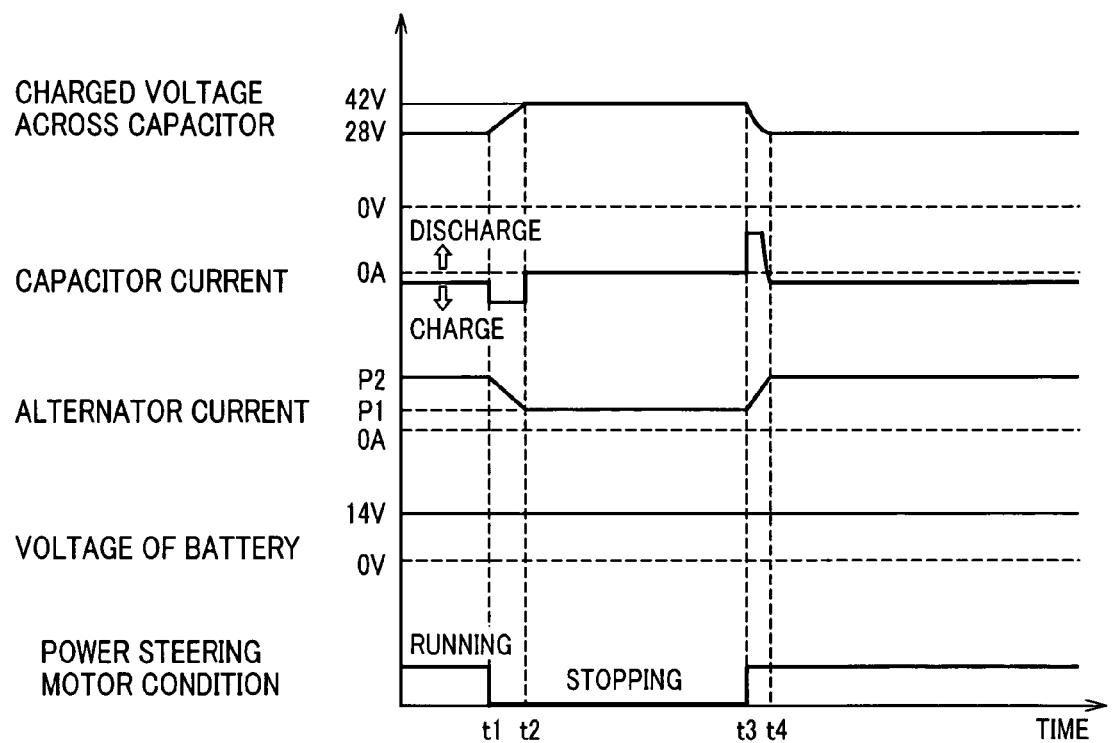
FIG. 8 is a timing chart schematically illustrating operations of the rotary electric system according to the fourth embodiment.

Operations of the rotary electric system RSC will be described hereinafter with reference to FIG. 8.

In the fourth embodiment, while the power steering motor 1 is running, a voltage across the DC input terminals of the three-phase inverter 2 is increased to be double of a DC power supply voltage (output voltage of the alternator 21). When the rated output voltage of the alternator 21, in other words, the maximum voltage of the battery 4 is 14 V (the rated voltage of the battery 4 is 12 V), the voltage across the capacitor 5 is charged to be 28 V before a time t1 (see FIG. 8).

When the power-steering assist operation of the power steering motor 1 is terminated at the time t1, the controller 7 stops the drive of each of the individual switching elements SW1 to SW6 of the tree-phase inverter 2 so as to interrupt the supply of the three-phase voltages to the power steering motor 1. The controller 7 individually drives each of the switching elements SW1 to SW6 so as to cause the three-phase coils Uc, Vc, and Wc of the armature 10 and the three-phase inverter 2 to operate as a boosting converter to thereby charge the capacitor 5 until the charged voltage across the capacitor 5 reaches 42 V.

During the capacitor 5 being charged, the diode 6 prevents currents from flowing from the neutral point N10 toward the battery 4 even if the voltage at the neutral point N10 becomes equal to or greater than 14 V. For this reason, the capacitor 5 is continuously charged even if the voltage at the neutral point N10 becomes equal to or greater than 14 V.

When the charged voltage across the capacitor 5 reaches 42 V, the controller 7 stops the drive of the inverter 2 at a time t2. Thereafter, the charged voltage across the capacitor 5 is maintained at 42 V. At the same timing t2, the voltage regulator 21a of the alternator 21 reduces an output current (alternator current) of the alternator 21 to only a value P1 required to drive the auxiliaries 22, and maintains the output current of the alternator 21 at the value P1.

Thereafter, at a time t3, when the power steering motor 1 is activated, electric power based on the charged voltage across the capacitor 5 is supplied to the power steering motor 1; this electric power is required to activate the power steering motor 1. This results that a current (capacitor current) is discharged from the capacitor 5 so that the charged voltage across the capacitor 5 is rapidly reduced.

At that time, the voltage regulator 21a of the alternator 21 increases the output current from the value P1 toward a value P2. In the alternator 21, because the rise in energizing current requires an amount of time, a predetermined delay occurs until the output current is increased from the value P1 to the value P2 corresponding to the rated output voltage of 14 V. However, the discharge from the capacitor 5 allows the delay to have little effect to the power steering operation of the motor 1 and the DC power supply voltage. Note that the voltage regulator 21a for example can obtain a trigger timing to increase the output current from an instruction sent from a power steering ECU (Electronic Control Unit) (not shown).

Thereafter, at a time t4, when the charged voltage across the capacitor 5 is reduced up to 28 V so that the voltage at the neutral point N10 is reduced up to 14 V, a boosting current is supplied to the capacitor 5 from the battery 4 via the diode 6. This results that the charged voltage across the capacitor 5 is maintained at 28 V. Thereafter, the output current of the alternator 21 is supplied to the three-phase coils Uc, Vc, and Wc of the power steering motor 1 via the neutral point N10. This results that the three-phase coils Uc, Vc, and Wc of the armature 10 and the three-phase inverter 2 under control of the controller 7 act as the boosting converter to thereby boost the charged voltage across the capacitor 5.

As described above, in the fourth embodiment, during the power steering motor 1 being inactive (not running), the capacitor 5 is charged so that the charged voltage thereacross reaches 42 V higher than the rated output voltage of 14 V of the power supply system (alternator 21 and the battery 4).

After the charging has been completed the charged voltage across the capacitor 5 is maintained.

Thus, even if the power steering motor 1 is activated before the output current of the alternator 21 reaches the value P2, the electric power based on the charged voltage across the capacitor 5 is supplied to the power steering motor 1. This makes it possible to prevent the reduction of the DC power supply voltage due to the delay of the increase in the output power of the alternator 21.

In addition, in the fourth embodiment, while the capacitor 5 is charged, the diode 6 prevents currents from flowing from the neutral point N10 toward the battery 4 even if the voltage at the neutral point N10 becomes equal to or greater than 14 V. For this reason, the capacitor 5 is continuously and smoothly charged even if the voltage at the neutral point N10 becomes equal to or greater than 14 V. Moreover, the effect associated with the charging of the capacitor 5 can be achieved with a simplified structure of the system RSC with the use of merely the diode 6.

In the fourth embodiment, the double layer capacitor 5 can momentarily supply a large amount of current to the power steering motor 1 as compared with secondary batteries.

Figure 9:
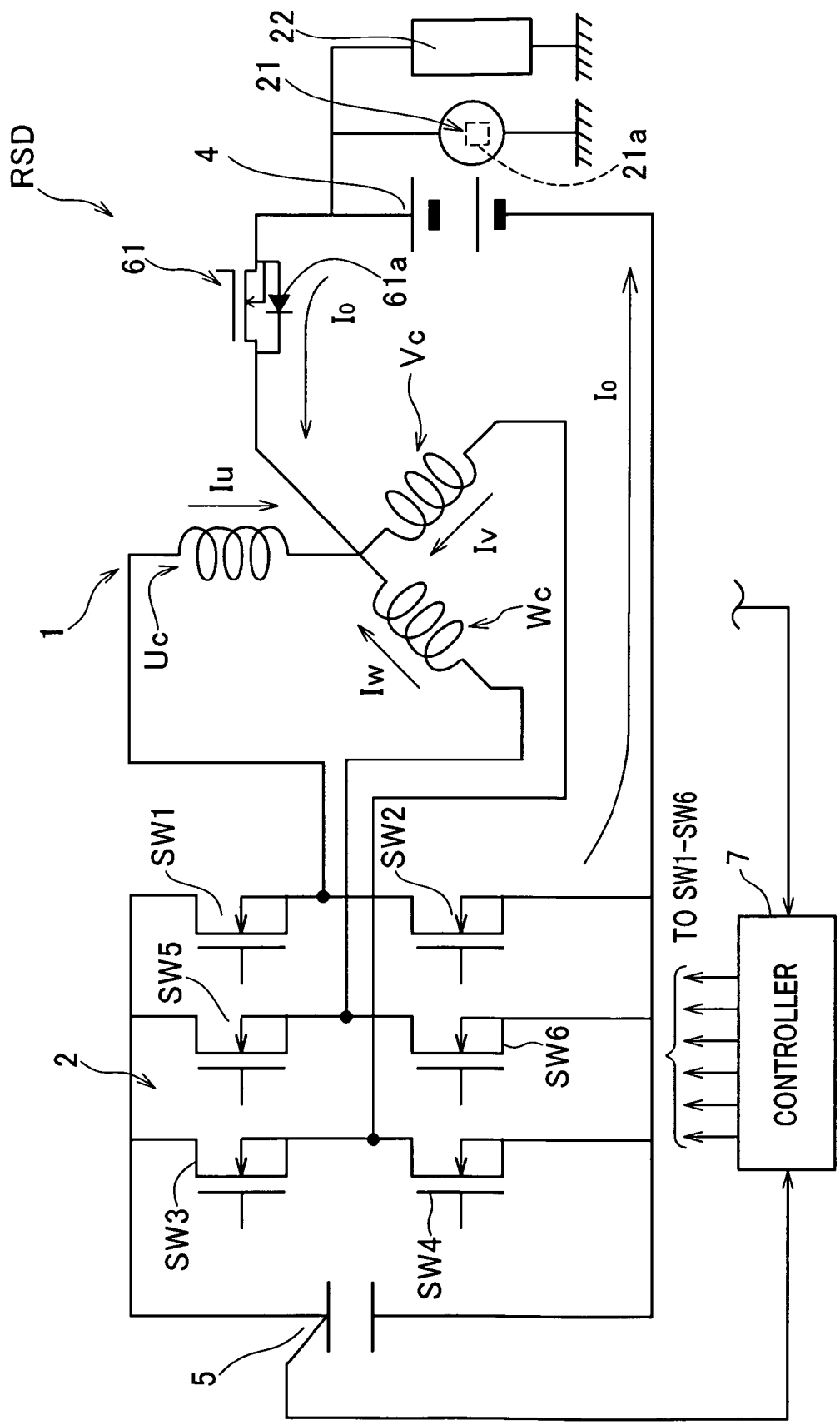
FIG. 9 is a circuit diagram schematically illustrating a rotary electric system according to a first modification of the fourth embodiment of the present invention.

FIG. 9 schematically illustrates a rotary electric system RSD according to a first modification of the fourth embodiment of the present invention.

In the first modification, in place of the diode 6, a PMOSFET 61 with an intrinsic diode 61a serving as a flywheel diode is used. In place of the MOSFETs, an alternative power transistor with a flywheel diode can be used.

Specifically, the drain of the PMOSFET 61 and the cathode of the flywheel diode (intrinsic diode) are connected with the neutral point N10 of the three-phase coils Uc, Vc, and Wc. The gate of the PMOSFET 61 is connected with the controller 7. The source of the PMOSFET 61 and the anode of the flywheel diode (intrinsic diode) are connected with the positive electrode of the battery 4.

The controller 7 works to drive the PMOSFET 61 on when the voltage at the neutral point N10 is lower than the voltage of the battery 4, and drive the PMOSFET 61 off when the voltage at the neutral point N10 is equal to or higher than the voltage of the battery 4.

The first modification prevents, while the capacitor 5 is charged, currents from flowing from the neutral point N10 toward the battery 4 even if the voltage at the neutral point N10 becomes equal to or higher than the voltage of the battery 4. For this reason, the capacitor 5 is continuously and smoothly charged even if the voltage at the neutral point N10 becomes equal to or higher than the voltage of the battery 4. The effect associated with the charging of the capacitor 5 can be achieved with a simplified structure of the system RSD with the use of merely the PMOSFET 61.

Figure 10:
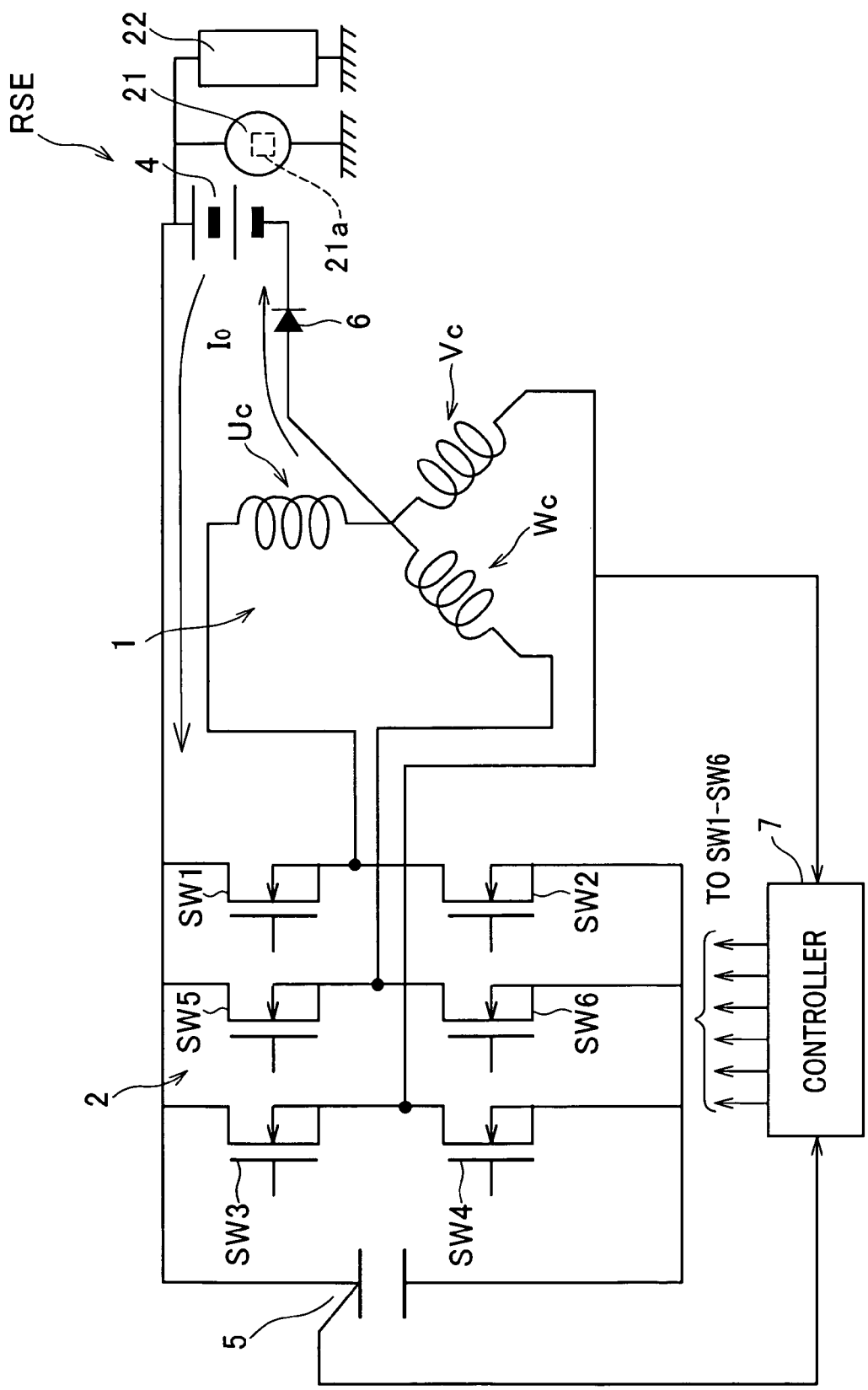
FIG. 10 is a circuit diagram schematically illustrating a rotary electric system according to a second modification of the fourth embodiment of the present invention.
Figure 11:
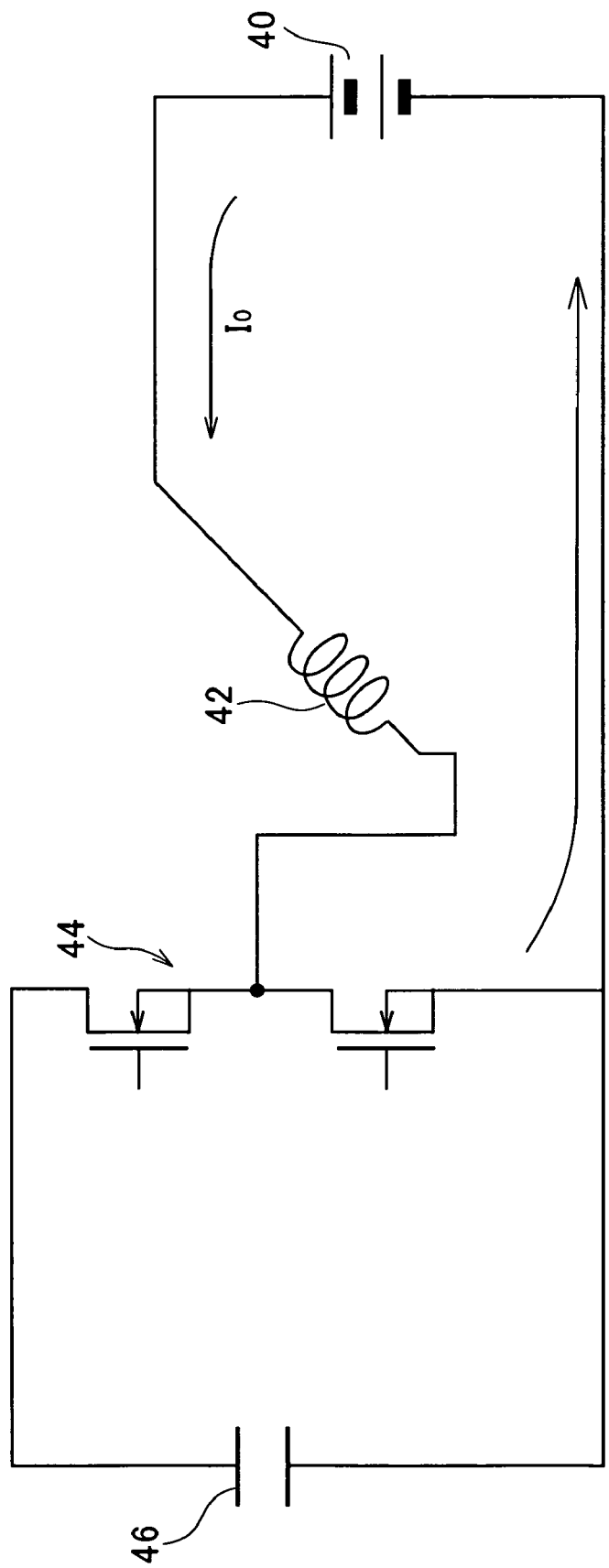
FIG. 11 is a circuit diagram schematically illustrating a zero-phase equivalent circuit for one phase winding, such as a W-phase winding, of a brushless motor.

FIG. 10 schematically illustrates a rotary electric system RSE according to a second modification of the fourth embodiment of the present invention.

When the rotary electric machine 1 has the same structure as that illustrated in FIG. 5 such that the positive electrode of the battery 4 is connected with the positive DC input terminal of the three-phase inverter 2, the anode of the diode 6 is connected with the neutral point N10 of the three-phase coils Uc, Vc, and Wc, and the cathode thereof is connected with the negative electrode of the battery 4.

The second modification prevents, while the capacitor 5 is charged, currents from flowing from the battery 4 toward the neutral point N10 even if the voltage at the neutral point N10 is equal to or lower than the voltage at the negative electrode of the battery 4. For this reason, the capacitor 5 is continuously and smoothly charged even if the voltage at the neutral point N10 is equal to or lower than the voltage at the negative electrode of the battery 4.

In the fourteenth embodiment, the three-phase rotary electric machine 1 serves as a power steering motor for assisting the driver's operation of a steering wheel of the motor vehicle. Specifically, the rotary electric systems according to the present invention preferably be applied to systems having a comparatively long standby time, such as the power steering system set forth above and a compressor drive motor system for an air conditioner installed in a motor vehicle.

While there has been described what is at present considered to be the embodiments and their modifications of the present invention, it will be understood that various modifications which are not described yet may be made therein, and it is intended to cover in the appended claims all such modifications as fall within the true spirit and scope of the invention.

What is claimed is:

1. A rotary electric system comprising:
    a rotary electric machine provided with an armature core and star-connected multiphase windings with a neutral point wound in the armature core, the rotary electric machine working to create torque when the star-connected multiphase windings are energized;
    a direct current power source connected with the neutral point of the star-connected multiphase windings; and
    a multiphase inverter connected with the star-connected multiphase windings and configured to convert a direct current voltage of the direct current power source into multiphase alternating current voltages and to supply the multiphase alternating current voltages to the star-connected multiphase windings to thereby energize the star-connected multiphase windings,
    wherein each of the star-connected multiphase windings has a predetermined winding configuration that prevents, when a zero-phase current is supplied from the direct current power source to the star-connected multiphase windings via the neutral point, a zero-phase magnetic flux created in the armature core based on the zero-phase current flowing in each phase winding of the star-connected multiphase windings from being cancelled out by a zero-phase magnetic flux created in the armature core based on the zero-phase current flowing in another one phase winding of the star-connected multiphase windings, and
    wherein the rotary electric machine comprises a rotor that has a plurality of magnetic poles arranged at regular pitches and that rotates based on the created torque, and each of the star-connected multiphase windings is wound in the armature core in any one of $5\pi/6$ radian fractional-pitch winding and $7\pi/6$ radian long-pitch winding as the predetermined winding configuration, the $5\pi/6$ radian fractional-pitch winding representing that a winding pitch between the multiphase windings is an electric angle of $5\pi/6$ radian smaller than the regular pitches of the magnetic poles, the $7\pi/6$ radian long-pitch winding representing that a winding pitch between the multiphase windings is an electric angle of $7\pi/6$ radian longer than the regular pitches of the magnetic poles.

2. A rotary electric system according to claim 1, wherein an average value of an amplitude of an output current of the multiphase inverter for each phase of the multiphase windings is offset by the zero-phase current supplied from the direct current power source.

3. A rotary electric system according to claim 1, wherein the armature core comprises a plurality of teeth equally spaced to define a plurality of slots therebetween, and the star-connected multiphase windings are individually wound around at least one of the teeth of the armature core such that the zero-phase magnetic fluxes created in the teeth of the armature core are inverted in polarity every two teeth.

4. A rotary electric system according to claim 1, wherein the armature core comprises a plurality of teeth equally spaced to define a plurality of slots therebetween, the number of the slots is 12, and the number of the poles is either 10 or 14.

5. A rotary electric system according to claim 1, wherein the direct current power source is a battery having positive and negative electrodes, the multiphase inverter has direct-current positive and negative terminals, the positive electrode of the battery is connected with the neutral point of the star-connected multiphase windings, the negative electrode of the battery is connected with the direct-current negative terminal of the multiphase inverter, and the multiphase inverter works to negatively offset an output current thereof.

6. A rotary electric system according to claim 1, wherein the direct current power source is a battery having positive and negative electrodes, the multiphase inverter has direct-current positive and negative terminals, the negative electrode of the battery is connected with the neutral point of the star-connected multiphase windings, the positive electrode of the battery is connected with the direct-current positive terminal of the multiphase inverter, and the multiphase inverter works to positively offset an output current thereof.

7. A rotary electric system according to claim 1, wherein the multiphase inverter has direct-current positive and negative terminals, further comprising: charging unit arranged between the positive and negative terminals of the multiphase inverter; and a controller operatively connected with the multiphase inverter and configured to control the multiphase inverter to thereby charge the charging unit by a voltage greater than the direct current voltage of the direct current power source when the rotary electric machine is inactive and thereby maintain the charged voltage in the charging unit.

8. A rotary electric system according to claim 7, further comprising: a restrictor configured to restrict a current from flowing from the neutral point toward the direct current power source.

9. A rotary electric system according to claim 7, wherein the charging unit is an electrical double layer capacitor.

10. A rotary electric system according to claim 1, wherein the rotary electric system is installed beforehand in a motor vehicle, and the rotary electric machine is a motor designed to assist a driver's operation of a steering wheel of the motor vehicle.

11. A rotary electric system according to claim 1, wherein the rotary electric system is installed beforehand in a motor vehicle, and the rotary electric machine is a drive motor designed to drive a compressor of an air conditioner installed in the motor vehicle.

12. A rotary electric system comprising:
a rotary electric machine provided with an armature core and star-connected multiphase windings with a neutral point wound in the armature core, the rotary electric machine working to create torque when the star-connected multiphase windings are energized;
a direct current power source connected with the neutral point of the star-connected multiphase windings; and
a multiphase inverter connected with the star-connected multiphase windings and configured to convert a direct current voltage of the direct current power source into multiphase alternating current voltages and to supply the multiphase alternating current voltages to the star-connected multiphase windings to thereby energize the star-connected multiphase windings,
wherein each of the star-connected multiphase windings has a predetermined winding configuration that prevents, when a zero-phase current is supplied from the direct current power source to the star-connected multiphase windings via the neutral point, a zero-phase magnetic flux created in the armature core based on the zero-phase current flowing in each phase winding of the star-connected multiphase windings from being cancelled out by a zero-phase magnetic flux created in the armature core based on the zero-phase current flowing in another one phase winding of the star-connected multiphase windings, the multiphase inverter having direct-current positive and negative terminals, further comprising:
a charging unit arranged between the positive and negative terminals of the multiphase inverter;
a controller operatively connected with the multiphase inverter and configured to control the multiphase inverter to thereby charge the charging unit by a voltage greater than the direct current voltage of the direct current power source when the rotary electric machine is inactive and thereby maintain the charged voltage in the charging unit; and
a restrictor configured to restrict a current from flowing from the neutral point toward the direct current power source, and
wherein the direct current power source has positive and negative electrodes, the restrictor comprises a diode, when the negative electrode of the direct current power source is connected with the negative terminal of the multiphase inverter, an anode of the diode is connected with the positive electrode of the direct current power source and a cathode thereof is connected with the neutral point of the multiphase windings, and, when the positive electrode of the direct current power source is connected with the positive terminal of the multiphase inverter, the cathode of the diode is connected with the negative electrode of the direct current power source and the anode thereof is connected with the neutral point of the multiphase windings.

13. A rotary electric system comprising:
a rotary electric machine provided with an armature core and star-connected multiphase windings with a neutral point wound in the armature core, the rotary electric machine working to create torque when the star-connected multiphase windings are energized;
a direct current power source connected with the neutral point of the star-connected multiphase windings; and
a multiphase inverter connected with the star-connected multiphase windings and configured to convert a direct current voltage of the direct current power source into multiphase alternating current voltages and to supply the multiphase alternating current voltages to the star-connected multiphase windings to thereby energize the star-connected multiphase windings,
wherein each of the star-connected multiphase windings has a predetermined winding configuration that prevents, when a zero-phase current is supplied from the direct current power source to the star-connected multiphase windings via the neutral point, a zero-phase magnetic flux created in the armature core based on the zero-phase current flowing in each phase winding of the star-connected multiphase windings from being cancelled out by a zero-phase magnetic flux created in the armature core based on the zero-phase current flowing in another one phase winding of the star-connected multiphase windings, the multiphase inverter having direct-current positive and negative terminals, further comprising:

a charging unit arranged between the positive and negative terminals of the multiphase inverter;

a controller operatively connected with the multiphase inverter and configured to control the multiphase inverter to thereby charge the charging unit by a voltage greater than the direct current voltage of the direct current power source when the rotary electric machine is inactive and thereby maintain the charged voltage in the charging unit; and a restrictor configured to restrict a current from flowing from the neutral point toward the direct current power source, and wherein the direct current power source has positive and negative electrodes, the restrictor comprises a semiconductor device composed of a power transistor and a flywheel diode, the controller is operatively connected with the power transistor and configured to:

drive the power transistor on when a voltage at the neutral point is smaller than the direct current voltage of the direct current power source; and drive the power transistor off when the voltage at the neutral point is greater than the direct current voltage of the direct current power source, when the negative electrode of the direct current power source is connected with the negative terminal of the multiphase inverter, an anode of the flywheel diode is connected with the positive electrode of the direct current power source and a cathode thereof is connected with the neutral point of the multiphase windings, and, when the positive electrode of the direct current power source is connected with the positive terminal of the multiphase inverter, the cathode of the flywheel diode is connected with the negative electrode of the direct current power source and the anode thereof is connected with the neutral point of the multiphase windings.

14. A rotary electric system according to claim 13, wherein the semiconductor device is a MOSFET with an intrinsic diode, and the intrinsic diode serves as the flywheel diode.

* * * * *